United States Patent [19]

Horie et al.

[11] Patent Number: 4,672,525
[45] Date of Patent: Jun. 9, 1987

[54] GUARD SYSTEM FOR INVERTER APPARATUS

[75] Inventors: Akira Horie; Shigetoshi Okamatsu, both of Katsuta, Japan

[73] Assignee: Hitachi, Ltd., Tokyo, Japan

[21] Appl. No.: 824,551

[22] Filed: Jan. 23, 1986

[30] Foreign Application Priority Data

Jan. 26, 1985 [JP] Japan .................................. 60-11770

[51] Int. Cl.⁴ ............................................ H02H 7/122
[52] U.S. Cl. ........................................ 363/58; 363/96; 363/136
[58] Field of Search ....................... 363/55, 57, 58, 96, 363/136, 137

[56] References Cited

FOREIGN PATENT DOCUMENTS 56-0042590 3/1982 Japan .
59-0063983 4/1984 Japan .

Primary Examiner—Patrick R. Salce
Assistant Examiner—Jeffrey Sterrett
Attorney, Agent, or Firm—Antonelli, Terry & Wands

[57] ABSTRACT

An inverter using gate turn-off thyristors (GTOs) is controlled by means of pulse width modulation (PWM) to control the speed of an induction motor. If the current flowing through the induction motor becomes an overcurrent which can still be cut off by the GTOs, a gate off signal is supplied to respective GTOs to interrupt the overcurrent. If any one of arms respectively corresponding to phases is short-circuited, a gate on signal is supplied to all GTOs to distribute the short circuit current among the arms, and the main circuit is interrupted by a high-speed breaker. At this time, a simultaneous gate on signal is given priority. If the simultaneous gate on signal is present, a simultaneous gate off signal is disabled. Owing to this configuration, destruction of the GTOs due to consecutive guard operation can be prevented.

18 Claims, 4 Drawing Figures

GUARD SYSTEM FOR INVERTER APPARATUS

BACKGROUND OF THE INVENTION

1. Field of the Invention

The present invention relates to a guard system for a main switching device of an inverter apparatus, and in particular to a guard system for inverter apparatus having self-cutoff function devices.

2. Description of the Related Art

With the advance of development of various power semiconductor devices in recent years, relatively large-capacity inverter apparatus using so-called self-cutoff switching devices such as GTO's (Gate Turn-Off Thyristors) or power transistors have been brought into use.

In general, there is a strict region of voltages or currents with which such a self-cutoff switching device can be switched safely. Switching operation beyond this region immediately results in permanent destruction of the device.

In an inverter apparatus using such self-cutoff switching devices, therefore, various guard devices are provided. A conventional method is disclosed in Japanese Patent Unexamined Publication No. 59-63983, for example. If the voltage or current of the main circuit of the inverter becomes an abnormal condition and such condition remains in a range recoverable by bringing the condition of the switching devices into the cutoff state, the switching devices of the main circuit of the inverter are simultaneously cutoff to carry out guard function. That is to say, the so-called simultaneous cut-off guard function is operated in the conventional method. If the failure state exceeds the range in which the state can be controlled by means of switching devices, the so-called simultaneous turn-on guard function is operated. That is to say, the switching devices of the main circuit of the inverter are simultaneously turned on to prevent the destruction of the switching devices. Additionally the entire circuit is guarded by cutting off the circuit using a fuse or a breaker.

However, it has been found that consecutive guard operation attempts of these guard functions destroy the switching devices contrary to expectation.

SUMMARY OF THE INVENTION

An object of the present invention is to provide a guard system for an inverter apparatus which is free from the above described drawbacks of the prior art and which carries out the guard function under any circumstances and surely prevents the switching devices of the main circuit of the inverter from being destroyed.

A feature of the present invention is that in an inverter apparatus having so-called simultaneous turn-on guard means and simultaneous cutoff guard means as guard means, operation of the simultaneous turn-on guard means is given priority over the operation of the simultaneous cutoff guard means.

If the simultaneous turn-on guard function and the simultaneous cutoff guard function are arranged to operate independently as described before, there are some cases where one of the guard function is started and thereafter the other of the guard function is activated.

If in this case the simultaneous cutoff guard function operates due to the abnormality in the load current and thereafter the simultaneous turn-on guard function operates due to an arm short circuit, it offers no problem, resulting only in the circuit interruption by means of a high-speed breaker or the like. And there is no fear of the destruction of the GTO's. If the simultaneous turn-on guard function operates due to the arm short circuit and thereafter the simultaneous cut-off guard function operates due to an abnormality in the load current, GTO's which have been in conduction states by excessively large currents until then as described above are simultaneously controlled to be turned off. In this case, the guard function is not attained, and there is a fear that the switching devices such as GTOs will be destroyed.

DESCRIPTION OF THE PREFERRED EMBODIMENT

Figure 1:
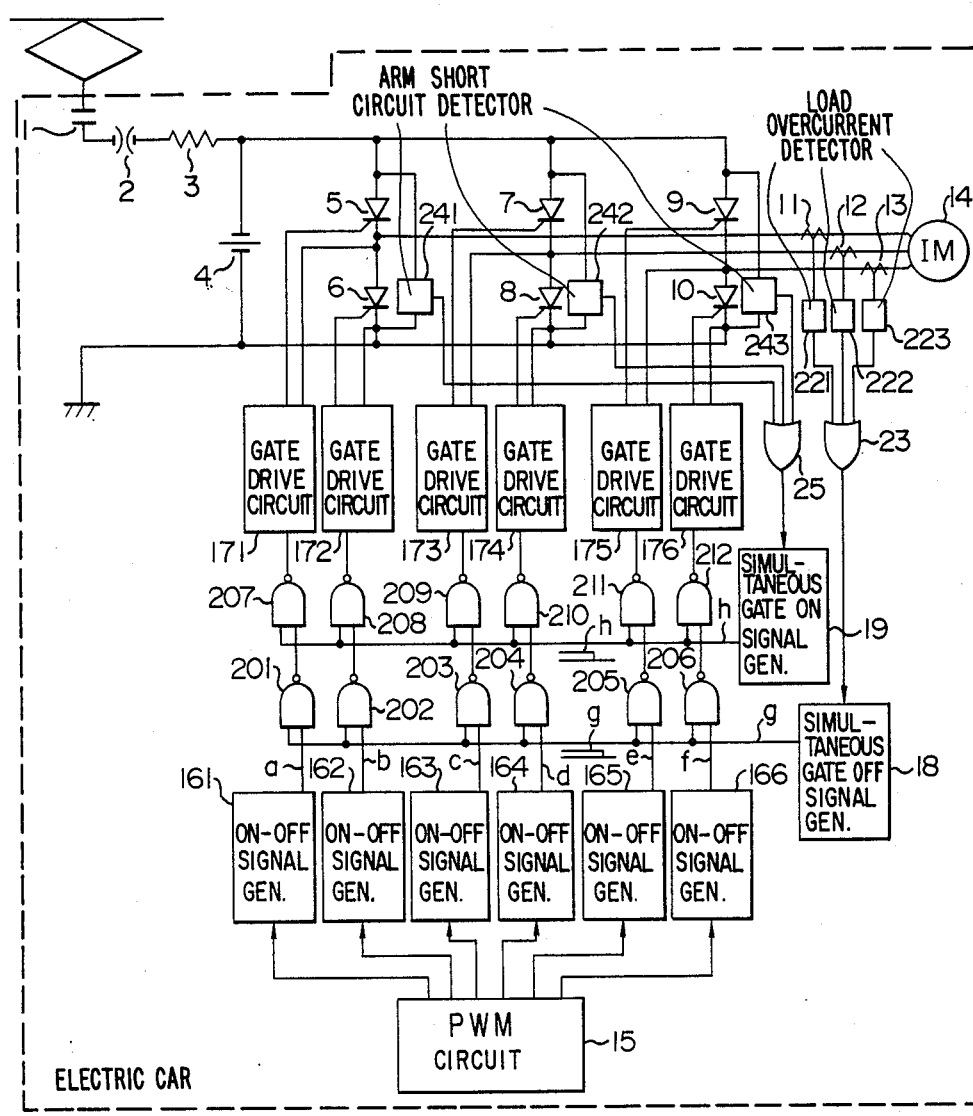
FIG. 1 is a configuration diagram for illustrating an embodiment of a guard system for inverter apparatus according to the present invention when it is applied to an electric car.

FIG. 1 schematically shows a main circuit and a control circuit of a bridge type inverter unit for an electric car, shown in block diagram form in broken line, using GTO's as switching devices. The main circuit includes a switch 1, a high-speed breaker 2, a filter reactor 3, a filter capacitor 4, GTOs 5 to 10 for constituting the main circuit of the inverter, current detectors 11 to 13, and an induction motor (hereafter referred to as IM) 14 constituting the load.

The main circuit of the inverter is a circuit of so-called bridge type. Among GTOs 5 to 10, pairs of GTOs 5 and 6, GTOs 7 and 8, and GTOs 9 and 10 are connected between DC power sources respectively in series. The respective pairs of GTOs constitute so-called arms. AC outputs are taken out at middle points of respective arms. The GTOs 5 to 10 are alternately turned on to effect the inverter operation. That is to say, one of the upper GTO 5, 7 or 9 and the lower GTO 6, 8, or 10 belonging to a pair is alternately turned on, while the other GTO belonging to the same GTO is turned off. A PWM modulator circuit 15 and ON-OFF signal generator circuit 161 to 166 produces ON-OFF signals shown in FIGS. 2(A), 2(B), 2(C) and 2(D) of Japanese Utility Model Unexamined Publication No. 57-42590, for example. Gate drive circuits 171 to 176 produce ON gate signals when the above described ON-OFF signal turns on and produce OFF gate signals when the ON-OFF signal turns off.

Reference numerals 18, 19 and 201 to 212 denote a simultaneous gate off signal generator circuit, a simultaneous gate on signal generator circuit, and NAND circuits, respectively. Load overcurrent detector circuits 221 to 223 produce output when outputs of the current detectors 11 to 13 exceed predetermined values, respectively. Outputs of the load overcurrent detector circuits 221 to 223 triggers the simultaneous gate off signal generator circuit 18 by way of an OR gate 23.

The simultaneous gate off signal generator circuit 18 functions to produce a simultaneous gate off signal g which assumes "1" under normal conditions and which changes to "0" when the load overcurrent has been detected.

Arm short circuit detector circuits 241 to 243 are connected in parallel to series circuits of GTO 5 and GTO 6, GTO 7 and GTO 8, and GTO 9 and GTO 10 representing respective phases, respectively. Each of the arm short circuit detector circuits 241 to 243 detects an arm short circuit when the voltage across its corresponding series circuit is lowered than the predetermined value. When the arm short circuit is detected, the simultaneous gate on signal generator circuit 19 is triggered to operate by way of an OR gate 25. The simultaneous gate on signal generator circuit 19 functions to produce a simultaneous gate on signal h which assumes "1" under normal conditions and which changes to "0" when the arm short circuit has been detected.

Operation of this embodiment will now be described by referring to the time chart of FIG. 2.

When neither a load current abnormality nor an arm short circuit is detected, both the simultaneous gate off signal g and the simultaneous gate on signal h remain "1". At this time, therefore, ON-OFF signals a and b are inverted by the NAND gates 201 and 202, respectively. The resultant signals are inverted again by the NAND gates 207 and 208, respectively. Signals i and j are thus obtained.

At this time, therefore, the ON-OFF signals a and b are applied to gate drive circuits 171 and 172 as the signals i and j, resulting in the normal operation as the inverter.

Thus the three-phase AC power is applied to the IM 14 to run the electric car. It is now assumed that the current flowing through the IM 14 has exceeded a predetermined value at time $t_1$. It is also assumed that the current magnitude does not exceed the current value of the GTOs 5 to 10 which can be cut off.

At the time $t_1$, the simultaneous gate off signal g thus changes from "1" to "0". As a result, outputs of the NAND gates 201 to 206 are fixed to "1" irrespective of the ON-OFF signals a to f. Accordingly, outputs of the NAND gates 207 to 212 are fixed to "0".

At this time, therefore, all GTO's of respective arms included in the main circuit of the inverter are simultaneously turned off, the simultaneous cutoff guard function being effected. The overcurrent detector circuits 221 to 223 do not produce outputs when an overcurrent exceeding the current of the GTO which can be cut off has been detected.

As described above, the GTO's 5 to 10 constituting the arms of the main circuit of the inverter are alternately turned on and off in the pairs of GTOs 5 and 6, GTOs 7 and 8, and GTOs 9 and 10. If two GTOs paired to form an arm simultaneously assumes the ON state due to some cause such as omission of the OFF signal, that arm forms a short circuit between the DC power soruces. Accordingly, an excessively large current (as large as several ten thousand amperes in some case) from the aerial conductor and the filter capacitor concentrates into that arm. If this state is left as it is, there is a fear that a GTO of that arm will be destroyed before the blocking of the circuit current caused by the operation of the high-speed breaker 2.

By way of precaution against such a case, therefore, detector means are provided to detect the arm short circuit quickly. If the arm short circuit occurs in any arm, GTOs 5 to 10 of all arms are simultaneously controlled to be turned on immediately thereafter. The above described surge current is thus distributed among all arms to prevent destruction of the GTOs. Thereafter the circuit breaking is effected by the high-speed breaker 2.

It is now assumed that the simultaneous gate on signal generator circuit 19 has been triggered at time $t_2$ due to the detection of the arm short circuit.

At the time $t_2$, therefore, the simultaneous gate on signal h changes from "1" to "0". As a result, the outputs of the NAND gates 207 to 212 are fixed to "1" irrespective of the outputs of the NAND gates 201 to 206 of the preceding stage.

At this time, therefore, all GTOs of arms included in the main circuit of the inverter are simultaneously turned on, the simultaneous turn-on guard function being attained. As a result, a large current flows from the aerial conductor into the main circuit through the switch 1 and the high-speed breaker 2. The main circuit is opened by the operation of the high-speed breaker 2 and succeeding operation of the switch 1.

Figure 2:
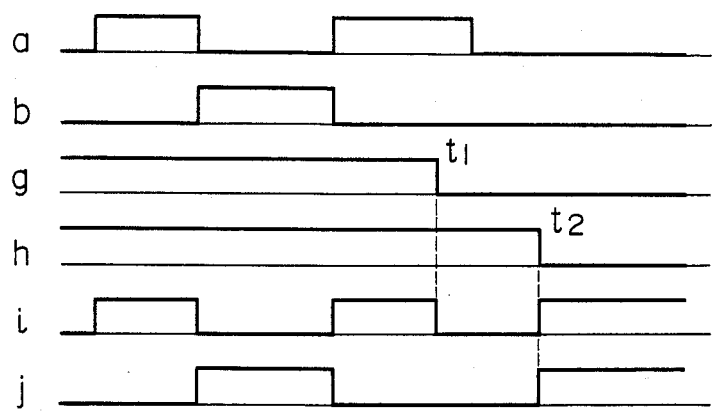
FIG. 2 is a time chart for illustrating the operation of the guard system shown in FIG. 1.

As evident from FIG. 2, transition of the simultaneous gate on signal h from "1" to "0" disables the simultaneous gate off control of the GTOs by means of the simultaneous gate off signal g. Thereby the simultaneous gate on control is always given priority.

In the foregoing description, the simultaneous gate off control is effected at the time $t_1$ and the simultaneous gate on control is subsequently effected at the time $t_2$. In this embodiment, the simultaneous gate on signal h is supplied to the NAND gates 207 to 212 which are placed in a stage subsequent to the NAND gates 201 to 206 supplied with the simultaneous gate off signal g as evident from FIG. 1. Therefore, these NAND gates 207 to 212 serve as means for inhibiting the simultaneous gate off signal g by means of the simultaneous gate on signal h. Once the simultaneous turn-on guard function if effected by means of the simultaneous gate on signal h, the simultaneous cut-off function is not effected, however, often the simultaneous gate off signal g is changed to "0" so long as the simultaneous gate on signal h is not restored from "0" to "1". Accordingly, the fear of destruction of the GTOs can be sufficiently eliminated.

Figure 3:
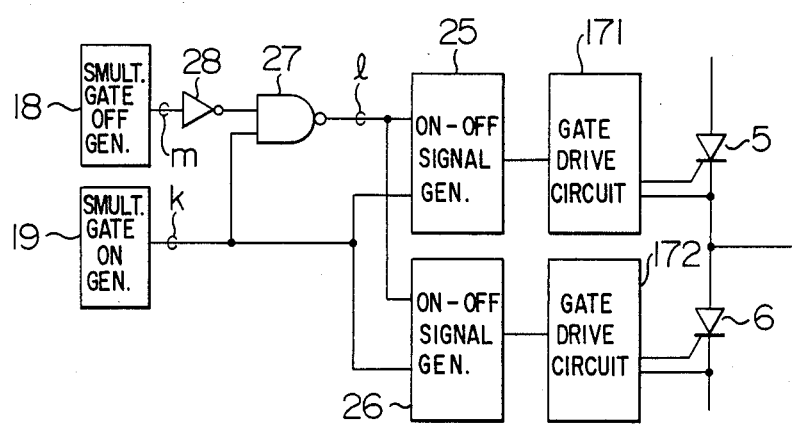
FIG. 3 is a configuration diagram for illustrating a principal part of another embodiment according to the present invention.

FIG. 3 is a circuit configuration diagram showing another embodiment of the present invention. A principal part of a circuit corresponding to only one phase is illustrated in FIG. 3. Under normal conditions, ON-OFF signal generator circuits 25 and 26 produce ON-OFF signals required for running the inverter. And the ON-OFF signal generator circuits 25 and 26 are configured to produce a signal fixed to the ON state when a signal k is applied thereto and produce a signal fixed to the OFF state when a signal 1 is applied thereto. A NAND gate 27 serves as inhibition means for disabling a simultaneous gate off signal m by the simultaneous gate on signal k. An inverter gate 28 compensates the signal inversion effected in the NAND gate 27. Remaining parts of FIG. 3 are the same as those of embodiment illustrated in FIG. 1.

Figure 4:
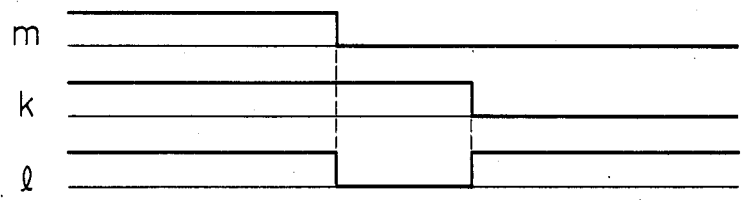
FIG. 4 is a time chart for illustrating the operation of the part shown in FIG. 3.

FIG. 4 is a time chart for illustrating the relation among signals appearing in FIG. 3, i.e., the relation among the simultaneous gate off signal m, the simultaneous gate on signal k, and the output signal 1 of the NAND gate 27. While the simultaneous gate on signal k assumes "1", the simultaneous gate off signal m is supplied to the ON-OFF signal generator circuits 25 and 26 as the signal 1 to allow the activation of the simultaneous cutoff guard function. Once the simultaneous gate on signal k changes from "1" to "0", however, transmission of the simultaneous gate off signal m is inhibited to give priority over the simultaneous cutoff guard function to the simultaneous turn-on guard function. As a result, the GTOs can be sufficiently prevented from destruction.

In the above described embodiments, GTOs were used as switching devices of the main circuit of the inverter. However, it is a matter of course that application of the present invention is not limited to such a case. For example, the present invention can be applied to any inverter using self-cutoff switching devices such as power transistors.

Owing to the present invention as described above, the simultaneous turn-on guard function can be activated with priority over the simultaneous cutoff guard function only by adding the simple logic circuit. Therefore, it is possible to realize a highly reliable guard system for an inverter apparatus which surely guards an inverter apparatus at all times and which precludes the possibility of destruction of switching devices.

We claim:

1. A guard system for an inverter comprising:
   an inverter for converting DC power to AC power to be supplied to a load, said inverter comprising semiconductor switching devices;
   first guard means for simultaneously cutting off said switching devices;
   second guard means for simultaneously turning on said switching devices; and
   means for preventing the operation of said first guard means during the operation of said second guard means.

2. A guard system for an inverter according to claim 1, wherein said first guard means responds to a predetermined value of a current flowing through said load.

3. A guard system for an inverter according to claim 2, wherein said semiconductor switching devices comprise gate turn-off thyristors.

4. A guard system for an inverter according to claim 2, wherein said second guard means responds to operation of means detecting a short circuit of an arm caused by simultaneous conduction of two sets of switching devices connected in series in said inverter.

5. A guard system for an inverter according to claim 4, wherein said semiconductor switching devices comprise gate turn-off thyristors.

6. A guard system for an inverter according to claim 4, wherein said arm short circuit detecting means responds to a drop in voltage across said two switching devices connected in series.

7. A guard system for an inverter according to claim 6, wherein said semiconductor switching devices comprise gate turn-off thyristors.

8. A guard system for an inverter-according to claim 1, wherein said first guard means responds to a current flowing through said load which exceeds a first predetermined value and does not exceed a second predetermined value in magnitude.

9. A guard system for an inverter according to claim 8, wherein said semiconductor switching devices comprise gate turn-off thyristors.

10. A guard system for an inverter according to claim 1, wherein said first guard means responds to a current flowing through said load which exceeds a first predetermined value and does not exceed a second predetermined value, and wherein said first predetermined value is a maximum value under normal conditions and said second predetermined value is a current value which can be interrupted by said switching devices.

11. A guard system for an inverter according to claim 10, wherein said semiconductor switching devices comprise gate turn-off thyristors.

12. A guard system for an inverter according to claim 1, wherein said second guard means responds to operation of means detecting a short circuit of an arm caused by simultaneous conduction of two sets of switching devices connected in series in said inverter.

13. A guard system for an inverter according to claim 12, wherein said semiconductor switching devices comprise gate turn-off thyristors.

14. A guard system for an inverter according to claim 12, wherein said arm short circuit detecting means responds to a drop in voltage across said two switching devices connected in series.

15. A guard system for an inverter according to claim 14, wherein said semiconductor swiching devices comprise gate turn-off thyristors.

16. A guard system for an inverter according to claim 1, wherein said semiconductor switching devices comprise gate turn-off thyristors.

17. A guard system for an inverter according to claim 1, wherein said preventing means comprises two NAND gates connected in series as a first stage and a second stage in an ON-OFF signal transmission path and wherein the NAND gate of the first stage is supplied with a simultaneous gate off signal and the NAND gate of the second stage is supplied with a simultaneous gate on signal.

18. A guard system for an inverter comprising:
   a three-phase inverter supplied with DC power from an aerial conductor through a switch and a high-speed breaker, said three-phase inverter including six GTOs connected as three series connected pairs, each pair comprising an arm of a three phase bridge configuration;
   a three-phase induction motor supplied with power by said three-phase inverter, said induction motor being connected to center taps of said three series connected pairs of said GTOs;
   an electric car driven by said induction motor;
   pulse width modulator means;
   gate drive circuits for turning on and turning off said GTOs on the basis of an ON-OFF signal sent out from said modulator means;
   first guard means for simultaneously turning off said GTOs, in response to a current of said induction motor larger than the maximum current at normal conditions and not larger than the interruptible current of the GTOs;
   second guard means for simultaneously turning on all of said GTOs, in response to simultaneous conduction of one series connected pair of said GTOs; and
   means for preventing the operation of said first guard means, in response to the operation of said second guard means.

* * * * *